United States Patent
Regal et al.

(10) Patent No.: US 7,339,893 B2
(45) Date of Patent: Mar. 4, 2008

(54) PRE-EMPTING LOW-PRIORITY TRAFFIC WITH HIGH-PRIORITY TRAFFIC ON A DEDICATED LINK

(75) Inventors: Michael Lawrence Regal, Pleasanton, CA (US); James Paul Rivers, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1095 days.

(21) Appl. No.: 10/392,744

(22) Filed: Mar. 18, 2003

(65) Prior Publication Data

US 2004/0205266 A1  Oct. 14, 2004

(51) Int. Cl.
*G08C 15/00* (2006.01)
*G06F 15/16* (2006.01)
*G06F 3/00* (2006.01)

(52) U.S. Cl. .................... 370/235; 709/232; 710/29

(58) Field of Classification Search .................. None
See application file for complete search history.

(56) References Cited

U.S. PATENT DOCUMENTS

| | | | |
|---|---|---|---|
| 5,043,981 A * | 8/1991 | Firoozmand et al. ....... 370/235 |
| 5,852,723 A * | 12/1998 | Kalkunte et al. ........... 709/235 |
| 6,393,457 B1 | 5/2002 | Allison et al. |
| 6,496,516 B1 | 12/2002 | Dabecki et al. |
| 6,741,559 B1 * | 5/2004 | Smeulders et al. ......... 370/230 |
| 6,990,114 B1 * | 1/2006 | Erimli et al. ................ 370/412 |
| 2002/0083185 A1 * | 6/2002 | Ruttenberg et al. ......... 709/232 |
| 2002/0085582 A1 * | 7/2002 | Kim ........................... 370/445 |
| 2005/0120149 A1 * | 6/2005 | Skarpness ..................... 710/29 |

FOREIGN PATENT DOCUMENTS

EP    1 128 612 A2    8/2001
WO    WO 01/26326 A1    4/2001

OTHER PUBLICATIONS

8b/10b Encoder V1.0 Product Specification, LogiCore, Nov. 3, 2000, by Xilinx Inc., 2100 Logic Dr., San Jose, CA 95124.

* cited by examiner

*Primary Examiner*—Kwang Bin Yao
*Assistant Examiner*—Warner Wong
(74) *Attorney, Agent, or Firm*—Charels E. Krueger

(57) ABSTRACT

A method and system for pre-empting a low-priority traffic with high-priority traffic over a serial link utilizes special codes to delimit a high-priority message embedded within a low-priority message.

24 Claims, 5 Drawing Sheets

US 7,339,893 B2

PRE-EMPTING LOW-PRIORITY TRAFFIC WITH HIGH-PRIORITY TRAFFIC ON A DEDICATED LINK

BACKGROUND OF THE INVENTION

In many systems, a dedicated link carries both low-priority and high-priority traffic. Low-priority traffic can be lengthy and cause high-priority traffic to incur greater than acceptable latencies.

A software example of this is type of latency is interrupt processing for microprocessors. An interrupt causes software to begin execution of an alternate code stream, thereby delaying normal code processing.

A hardware example of this is the PCI Bus "Latency Timeout" protocol, where a central arbiter can force a bus master to get off the shared bus to allow another master to perform a transaction.

In both the software and hardware examples, the time to switch over to the interrupting transaction can be arbitrary and significant. Accordingly, improved and faster techniques for switching from low-priority to high-priority traffic on a dedicated link are required.

BRIEF SUMMARY OF THE INVENTION

In one embodiment of the invention, high-priority traffic immediately interrupts low-priority traffic and is embedded within a low-priority data stream.

In another embodiment of the invention, special codes in a transmitted date stream delimit the embedded high-priority traffic from the low-priority traffic.

In another embodiment, the transceivers utilize 8B/10B encoding and the delimiting characters for an embedded high-priority data stream are specially designated K characters.

In another embodiment of the invention, if during transmission of low-priority traffic, it is required to transmit high-priority traffic, then transmission of low-priority traffic is paused. A special initial delimiting character is inserted into the data stream to identify the start of a high-priority traffic stream which is followed by the high-priority data stream. When the high-priority traffic transmission is complete a special terminal delimiting character is inserted into the data stream and transmission of the low-priority data stream continues from where it left off immediately after the special delimiting character.

Other features and advantages of the invention will be apparent from the following detailed description and appended drawings.

DETAILED DESCRIPTION OF THE INVENTION

Reference will now be made in detail to various embodiments of the invention. Examples of the these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
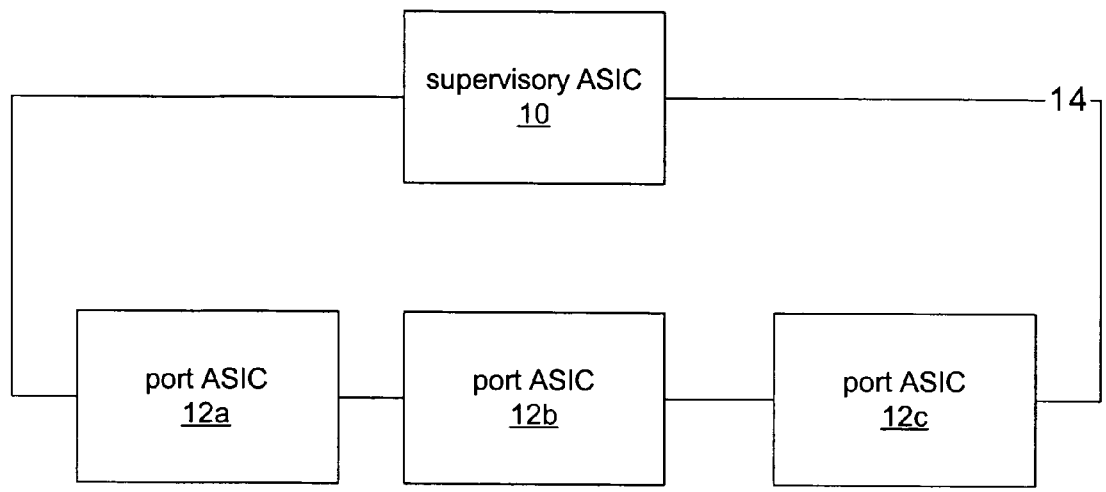
FIG. 1 is a block diagram of a system including ASICs coupled by a dedicated serial link.

A first embodiment will now be described in the context of a supervisor ASIC (application specific integrated circuit), having an embedded microprocessor, coupled to port ASICs by a serial link, designed by the assignee of the present invention, depicted in FIG. 1. In FIG. 1, a supervisor ASIC 10 is coupled to three port ASICs 12a,b, and c by a dedicated serial link 14.

Figure 2:
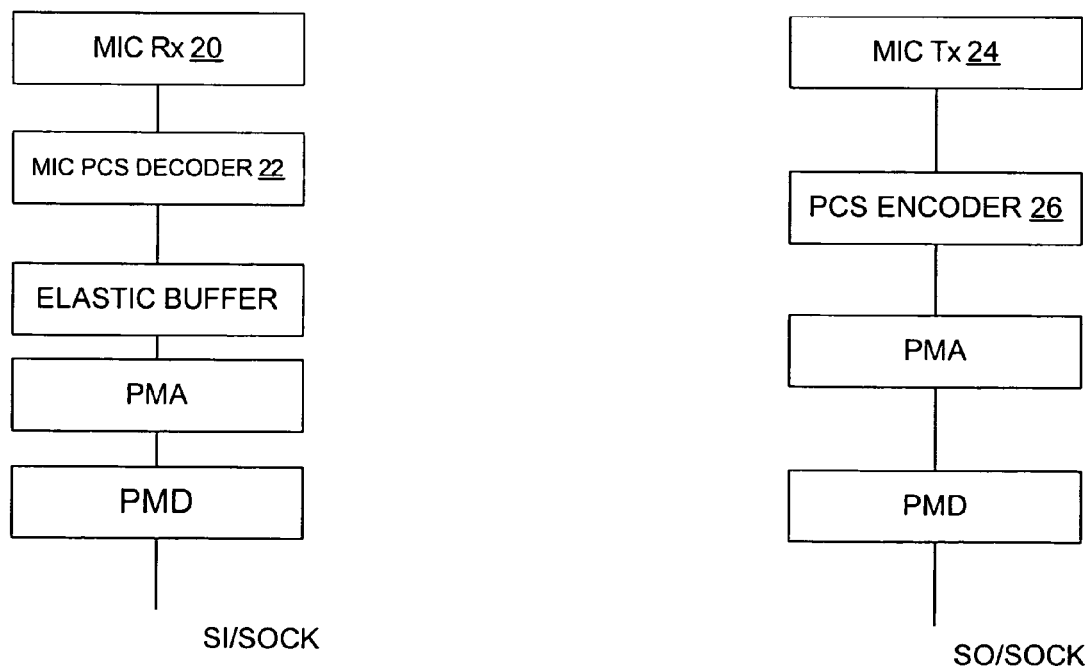
FIG. 2 is a block diagram of an interface to the serial link.

FIG. 2 is a block diagram of the interface coupled to the serial link 14. The receiver 20 is coupled to a physical coding layer including (PCS) a PCS decoder 22 coupled to the serial link 14 to receive SI (signal in) and SICK (signal in clock) signals. The transmitter 24 is coupled to the PCS including a PCS encoder 26 to transmit SO (signal out) and SOCK (signal out clock) signals.

In this embodiment, a message is a single transaction that occurs over the dedicated link 14 and may have variable length up to 2 KBytes for frame transfers (including frame data, message header, and frame check sequence (FCS)). A message is initiated by the Supervisor ASIC to convey part or all of a command to one Port ASIC or all the Port ASICs. The command and targeted Port ASICs are identified by the first byte of the message. Further bytes depend on the command type and may be written by either the Port ASIC or Supervisor ASIC.

An example will now be described where the low-priority message is a Frame Transfer, where the Supervisor ASIC 10 moves frames to or from Port ASICs without CPU intervention, and the high-priority message are a Direct Access messages used to control direct access to a Port ASIC's registers and RAM.

Long frame transactions take considerable time on the dedicated serial link. For example, in this embodiment, the maximum frame size is 1518 bytes, having 8 bits/byte, and the data transfer rate on the dedicated serial link is 1 nsS/bit. Therefore the time to transfer this maximum-sized frame would be (1518*8)* 1 nS=12.144 uS. If the dedicated serial link were idle, a large number of register reads or writes could be accomplished in that time period, on the order of 10 or more. If a read is scheduled during a frame transaction then the read is pending until the frame transaction is completed. This pending read tends to stall the microprocessors' progress, so minimal latencies for these reads are desirable. If a register read is issued just after the beginning of a maximum frame size fetch, the read will be stalled for 12.144 uS which results in a significant loss of performance.

To minimize latencies, a mechanism for time sensitive accesses to preempt frame accesses has been developed. A time sensitive Direct has priority over a Frame Access (Frame Transmit Access, or Frame Receive Access). The time sensitive access will always win in arbitrating for an idle management interface, and will embed itself into a Frame Transmit Access or a Frame Receive Access in order to get onto the management interface.

The description of the process for embedding high-priority messages within low-priority messages will now be described. In this embodiment the dedicated link uses 8B/10B encoding/decoding, allowing access to both control and data characters. Thus the PCS encoder and decoder of FIG. 2 are an 8B/10B encoder and an 8B/10B decoder.

As is known by persons of skill in the art, the 8B/10B encoding format encodes 8-bit input data into 10-bit symbols for transmission. The 8-bit blocks are partitioned into 5-bit and 3-bit sub-blocks which are respectively encoded into 6-bit and 4-bit sub-blocks. A prefix of D or K is used to distinguish between data and special characters. A symbol is named by its prefix and the decimal values of its sub-blocks. For example, D31.1 is a data symbol having a first sub-block of (1111) which has a decimal value of 31 and a second sub-block of (100) having a decimal value of 1. Note that the LSB is on the left.

The disparity of a block of data is defined as the difference between the number of ones and zeros in the block. A positive disparity reflects the excess of 1 s over 0s. Each symbol may be encoded in two ways; a primary encoding with a positive disparity and an alternate encoding with a negative disparity. The encoder selects the disparity of the symbol to maintain a running disparity value between +1 and −1 to achieve the goals of maintaining transition density and limited run lengths.

In all SerDes units, after individual bit alignment has been established, the beginning and ending of each symbol being transmitted in a serial data stream must be determined because byte boundaries associated with the parallel data are lost during serialization. Accordingly, as described above, most SerDes units send a series of special characters known as commas.

All of these commas are unique characters within the 8B/10B code that begin with either a 1100000XXX or 0011111XXX, depending on disparity and individual K character rules. These versions are called primary (positive disparity) and alternate (negative disparity) versions. These commas are sent in a predetermined fashion so that the clock recovery unit can locate the boundaries of the symbols being transmitted by a SerDes unit.

The K characters that include commas are K28.1, K28.5, and K28.7. As described above these K characters are transmitted as positive or negative disparity versions depending on the running disparity.

In this embodiment special characters are interpreted by the Physical Coding Layer (PCS) to delimit the beginning and end of an inserted message. These special characters are interpreted by the PCS to delimit and extract embedded high-priority messages from low-priority messages.

Table 1 lists the special code groups used in this embodiment of the invention.

| Character Name | Character Symbol | Code Group Name | Control Bit | Octal Value |
| --- | --- | --- | --- | --- |
| Data Character | /D/ | D0.0-D31.7 | 0 | 0x00-0xFF |
| Idle Character | /I/ | K28.5 | 1 | 0xBC |
| Error Propagation | /V/ | K28.1 | 1 | 0x3C |

-continued

Table 1 lists the special code groups used in this embodiment of the invention.

| Character Name | Character Symbol | Code Group Name | Control Bit | Octal Value |
| --- | --- | --- | --- | --- |
| Character Start_of_Direct | /P/ | K28.0 | 1 | 0x1C |
| Character End_of_Direct | /Q/ | K23.7 | 1 | 0xF7 |
| Character Start_of_Frame | /S/ | K27.7 | 1 | 0xFB |
| Character End_of_Frame | /T/ | K29.7 | 1 | 0xFD |

Because of the different control characters utilized by high versus low-priority traffic, high-priority traffic streams can be embedded into a low-priority stream by the transmitter. The receiver uses these control characters to extract the high-priority traffic from within the low-priority traffic.

The actions performed at the receiver and transmitter will now be described with reference the block diagram of FIG. 3 and to the flow charts of FIGS. 4 and 5.

Figure 3:
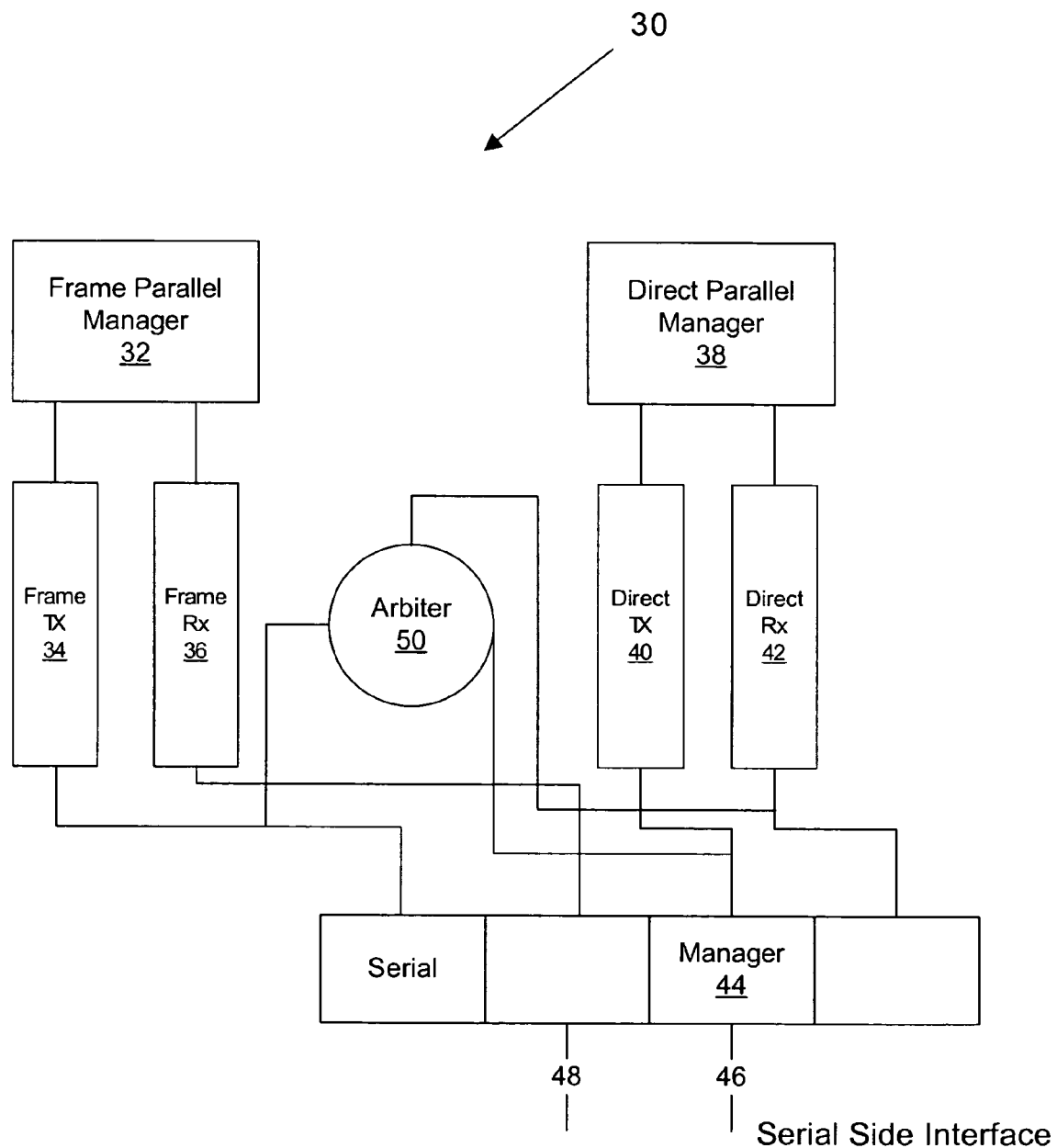
FIG. 3 is a block diagram of an embodiment of the invention.

Turning first to FIG. 3, a high-level block diagram of logic 30 for embedding and extracting high-priority data is depicted. A Frame Parallel Manager 32 provides frames to a Frame Tx buffer 34 and receives frames from a Frame Rx buffer 36. A Direct Parallel Manager 38 provides direct data to a Direct Tx buffer 40 and receives direct data from a Direct Rx buffer 42. A Serial Manager 44 has an internal interface connected to the Frame and Direct buffers and a Serial Interface having an input 46 and output 48 coupled to the serial data path (not shown). Internal side inputs are coupled to the outputs of the Frame Tx and Direct Tx buffers 34 and 40 and internal side outputs are coupled to the inputs of the Frame Rx and Direct Rx buffers 36 and 42. An Arbiter 50 is coupled to the Frame Tx and Direct Tx buffers 34 and 40 and to the internal outputs of the Serial Manager 44.

The operation of the system of FIG. 3 will now be described. The actions described below with reference to the flow chart can be controlled by state machines in the Arbiter 50. The state machines may be implemented as program code, stored on a computer readable medium, that is executed by a digital computer. The computer readable medium may include, among other things, magnetic media, optical media, electromagnetic fields encoding digital information, and so on.

Figure 4:
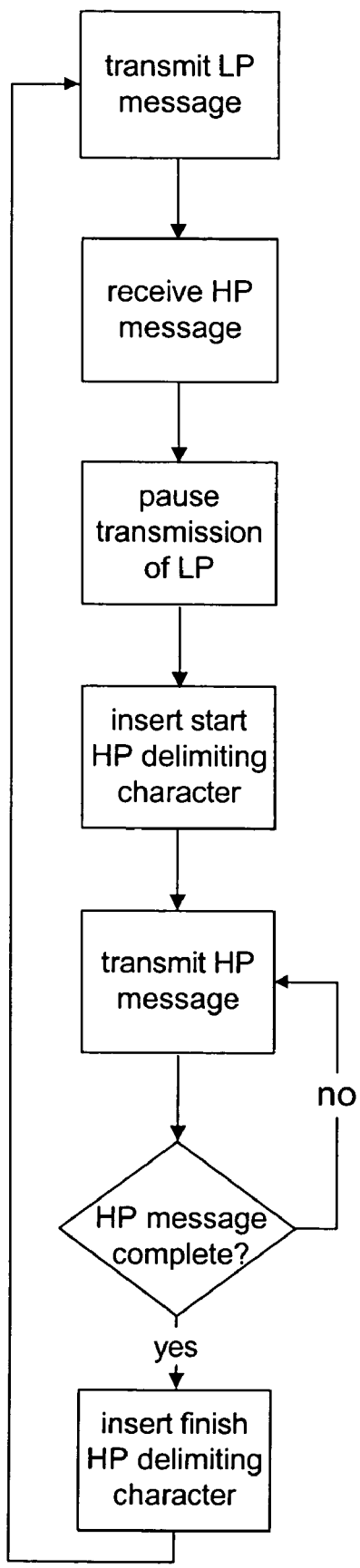
FIG. 4 is a flow chart of an embodiment of transmitter processing.

Turning now to the transmission of data and referring to FIG. 4, if a low-priority (LP) message is being transmitted, the Serial Manager 44 transfers data from the Frame Tx Buffer 34 to the Serial Interface output line 48. If the Arbiter 50 detects that a high-priority (HP) message is ready to be transmitted, then the Arbiter 50 controls the Serial Manager 44 to pause the transmission of the LP message, insert the /P/ character into the transmitted data stream, and immediately thereafter transfer the direct data of the HP message from the Direct Tx Buffer 40 to the Serial Interface output line 48. When the Arbiter 50 detects that transmission of the HP message is complete then Arbiter 50 controls the Serial Manager 44 to insert the /Q/ character into the data stream and begin transferring data from the Frame Tx buffer 34 to the Serial Interface output line 48. The transmission of the LP message is then continued from the point where the pause took place.

Figure 5:
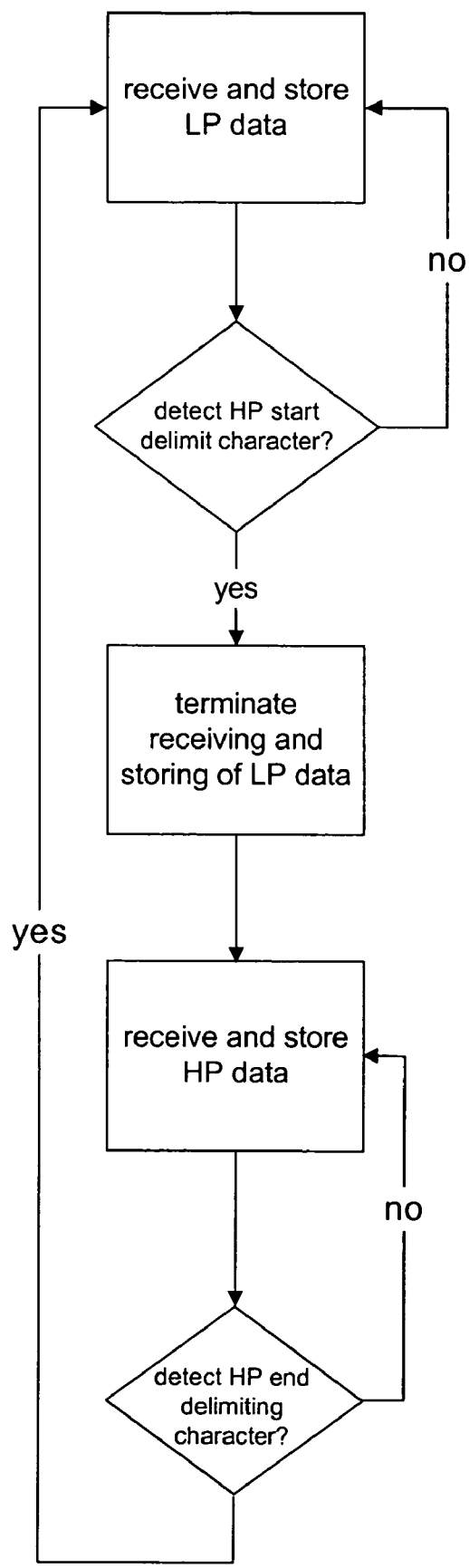
FIG. 5 is a flow chart of an embodiment of receiver side processing.

Turning next to the receiving of data and referring to FIG. 5, during reception of LP data the Serial Manager 44 transfers data from the Serial Interface input line 46 to the Frame Rx buffer 36. If the Arbiter 50 detects a /P/ character in the received data stream then receiving and storing of an LP message is paused and the Arbiter 50 controls the Serial Manager 44 to transfer the received HP data between the /P/ and /Q/ character to the Direct Rx buffer 42. Subsequent to the detection of the /Q/ character the Arbiter 50 controls the Serial Manager 44 to transfer data received on the input line 46 of the Serial Interface to the Frame Rx buffer 36.

Figure 6:
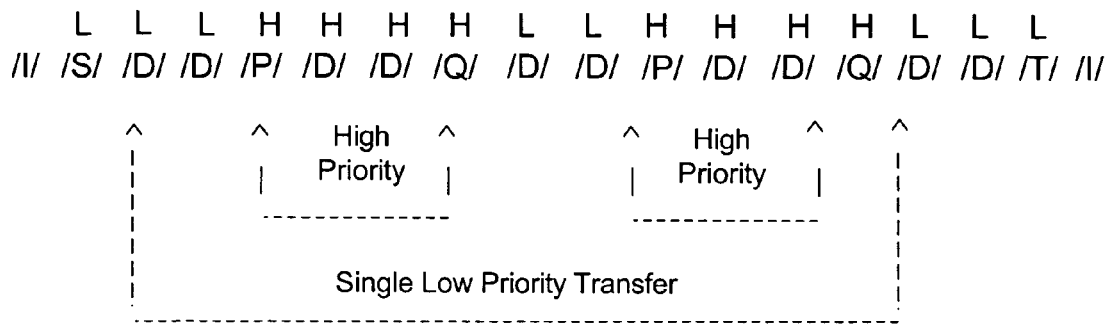
FIG. 6 is a high-level schematic diagram of a data stream utilizing an embodiment of the invention.

An example of embedding a high-priority data stream in a low-priority data stream is depicted in FIG. 6. In this example, /S/ and /T/ characters delimit low-priority traffic; /P/ and /Q/ characters delimit high-priority traffic. /I/ represents an Idle character.

Figure 7:
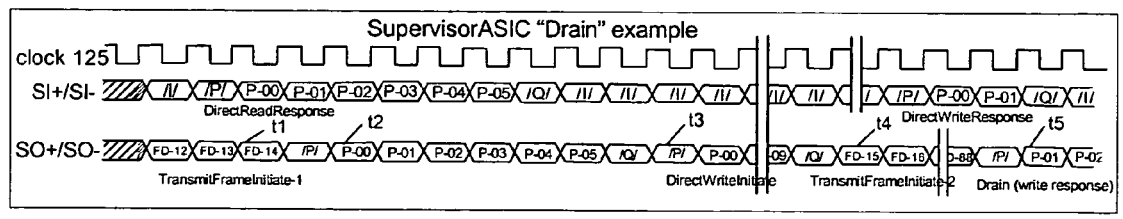
FIG. 7 is a detailed schematic diagram of a data stream utilizing an embodiment of the invention.

A more detailed example a data stream utilizing this embodiment of the invention is depicted in FIG. 7. In this example the input to the supervisor ASIC is depicted in the SI+/SI− data stream and the output from the supervisor ASIC is depicted in the SO+/SO− data stream.

At t1 the supervisory ASIC 10 is transmitting a low-priority Transmit Frame Initiate message when it receives a high-priority Direct Read Response, delimited by the /P/ and /Q/ special characters, from one of the port ASICs 12.

At t2 the Supervisor ASIC immediately issues a high-priority Drain Buffer message, delimited by the /P/ and /Q/ special characters, so that a Port ASIC can reclaim the buffer space used to insert the Direct Read Response Message. Note that the Drain Buffer message is embedded in the low-priority Transmit Frame Imitate Message.

At t3 the supervisor ASIC follows the Drain Buffer message with a high-priority Direct Write Initiate message, delimited by the /P/ and /Q/ special characters, which is also embedded in the original Transmit Frame Initiate message. At t4 the Supervisor ASIC continues transmitting the low-priority Transmit Frame Initiate message. At t5 the Supervisor ASIC receives Direct Write response from a Port ASIC and at t6 the Supervisor ASIC issues a Drain Buffer message.

As depicted in FIG. 6, each embedded message is delimited by the /P/ and /Q/ characters. Also, as depicted in FIG. 6, the latency between the receipt of the first byte of a direct message and the transmission of the first delimiting character of the response message is only one clock. Further, there is no delay between the transmission of the final delimiting character of the inserted high-priority data stream and transmission of the paused low-priority data stream.

Thus, in the described system the low-priority data stream doesn't get killed by continuing interruptions by high-priority messages. The low-priority data stream continues be transmitted during intervals between high-priority transmissions.

The invention has now been describe with reference to the preferred embodiments. Alternatives and substitutions will now be apparent to persons of ordinary skill in the art. In particular, the 8B/10B decoding scheme is not critical to practicing the invention. Other decoding schemes are feasible that include control characters inserted into a data stream. Further, the particular message types utilized as examples are not critical to practicing the invention.

What is claimed is:

1. A system that pre-empts low-priority traffic with high priority traffic over a dedicated link coupling a transmitter to a receiver, said system comprising:
   at the transmitter:
   an HPTx buffer adapted to hold for holding high-priority data to be transferred;
   an LPTx buffer adapted to hold for holding low-priority data to be transferred; and
   a Tx controller, adapted to transmits a low-priority initial delimiter character followed by transmission of successive low-priority data words from the LPTx buffer without further transmission of low-priority delimiter characters, to pause pauses transmission of successive low-priority data words from the LPTx buffer if high-priority data is ready to transmit, to transmit a high-priority initial delimiter character, to stop transmitting low-priority data and to transmit successive high-priority data words from the HPTx buffer without further transmission of high-priority delimiter characters subsequent to transmission of the high-priority initial delimiter character, to transmit a delimited by initial and terminal high-priority delimiting character when the high-priority data is finished transmitting, to resume transmission of successive low-priority data words without further transmission of low priority delimiter characters from the point where transmission of successive low-priority data words left off after transmission of the high-priority terminal delimiter character, and to transmit a low-priority terminal delimiter character when the low-priority data is finished transmitting;
   at the receiver:
   an HPRx buffer adapted to hold high-priority data being received;
   an LPRx buffer adapted to hold low-priority data being received; and
   an Rx controller, having data outputs coupled to the HPRx and LPRx buffers, and data and control inputs, with the Rx controller, while storing received successive low-priority data words in the LPRx 30 buffer, upon detection of a high priority initial delimiting control character stores subsequently received successive high-priority data words in the HPRx buffer until the detection of the high priority terminal delimiting character, and then to store received successive low priority data in the LPRx buffer.

2. The system of claim 1 where the initial and terminal control characters are selected 8B/10B control characters.

3. A system that pre-empts low-priority traffic with high-priority traffic over a dedicated link coupling a transmitter to a receiver, said system comprising:
   at the transmitter:
   an HPTx buffer adapted to hold high-priority data to be transferred;
   an LPTx buffer adapted to hold low-priority data to be transferred; and
   a Tx controller, adapted to transmits a low-priority initial delimiter character followed by transmission of successive low-priority data words from the LPTx buffer without further transmission of low-priority delimiter characters, to pause transmission of successive low-priority data words from the LPTx buffer if high-priority data is ready to transmit, to transmit a high-priority initial delimiter character, to stop transmitting low-priority data and to transmit successive high-priority data words from the HPTx buffer without further transmission of high-priority delimiter characters subsequent to transmission of the high-priority initial delimiter character, to transmit a high priority terminal delimiting character when the high-priority data is finished transmitting, to resume transmission of successive low-priority data words without further transmission of low priority delimiter characters from the point where transmission of successive low-priority data words left off after transmission of the high-priority terminal delimiter character, and to transmit a low-priority terminal delimiter character when the low-priority data is finished transmitting.

4. The system of claim 3 where the initial and terminal control characters are selected 8B/10B control characters.

5. A system that pre-empts low-priority traffic with high-priority traffic over a dedicated link coupling a transmitter to a receiver, said system comprising:
   at the receiver:
   an Rx controller, having data outputs coupled to the HPRx and LPRx buffers, and data and control inputs, with the Rx controller, while storing received successive low-priority data words including no low-priority delimiter characters stream in the LPRx buffer, upon detection of a high-priority initial delimiting control character adapted to store subsequently received successive high-priority data words including no high-priority delimiter characters in the HPRx buffer until the detection of a high-priority terminal delimiting character, and then to store received successive low priority data including no low-priority delimiter characters in the LPRx buffer.

6. The system of claim 5 where the initial and terminal control characters are selected 8B/10B control characters.

7. A system that pre-empts low-priority traffic with high-priority traffic over a dedicated link coupling a transmitter to a receiver, said system comprising:
   at the transmitter:
   an HPTx buffer adapted to hold high-priority data to be transferred;
   an LPTx buffer adapted to hold low-priority data to be transferred;
   a Tx controller, having data inputs coupled to the HPTx and LPTx buffers, and data and control outputs;
   an encoder, having data and control inputs coupled to the data and control outputs of the Tx controller, for generating a delimiting control character based on data provided at the data output of the Tx controller when the Tx controller provides a control signal at the control output; and
   with the Tx controller, while transmitting successive low-priority data words from the LPTx buffer without further transmission of low-priority delimiter characters, adapted to pause transmission of successive low-16 priority data words and to provide the control signal and a first data word encoding a high-priority initial delimiting control character which is transmitted prior to transmitting successive high-priority data words from the HPTx buffer without further transmission of high-priority delimiter characters, to provide the control signal and a second data word encoding a terminal delimiting control character and to transmit the high-priority terminal delimiting control character, and then transmitting, after transmission of the high-priority terminal control character, low-priority successive data words from the LPTx buffer without further transmission of low-priority delimiter characters from the point where transmission of low-priority data left off;
   at the receiver:
   an HPRx buffer adapted to hold high-priority data being received;
   an LPRx buffer adapted to hold low-priority data being received;
   a Rx controller, having data outputs coupled to the HPRx and LPRx buffers, and data and control inputs;
   a decoder, having data and control outputs coupled to the data and control inputs of the Rx controller, adapted to generate a control character based on data provided at the data output of the decoder when the decoder provides a control signal at the control output; and
   with the Rx controller, while storing received successive low-priority data words in the LPRx buffer, upon detection of a high priority initial delimiting control character provided by the decoder adapted to store subsequently received successive high-priority data words stream in the HPRx buffer until the detection of the high-priority terminal delimiting character provided by the decoder, and then to store received successive low-priority data words in the LPRx buffer.

8. The system of claim 7 where the encoder is an 8B/10B encoder and the decoder is an 8B/10B decoder.

9. A system that pre-empts low-priority traffic with high-priority traffic over a dedicated link coupling a transmitter to a receiver, said system comprising:
   at the transmitter:
   an HPTx buffer adapted to hold high-priority data to be transferred;
   an LPTx buffer adapted to hold low-priority data to be transferred;
   a Tx controller, having data inputs coupled to the HPTx and LPTx buffers, and data and control outputs;
   an encoder, having data and control inputs coupled to the data and control outputs of the Tx controller, for generating a delimiting control character based on data provided at the data output of the Tx controller when the Tx controller provides a control signal at the control output; and
   with the Tx controller, while transmitting successive low-priority data words from the LPTx buffer without further transmission of low-priority delimiter characters, adapted to pause transmission of successive low-priority data words and to provide providing the control signal and a first data word encoding a high-priority initial delimiting control character which is transmitted prior to transmitting successive high-priority data words from the HPTx buffer without further transmission of high-priority delimiter characters, to provide the control signal and a second data word encoding a terminal delimiting control character and to transmit the high-priority terminal delimiting control character, and then transmitting, after transmission of the high-priority terminal control character, low-priority successive data words from the LPTx buffer without further transmission of low-priority delimiter characters from the point where transmission of low-priority data left off.

10. The system of claim 9 where the encoder is an 8B/10B encoder.

11. A system that pre-empts low-priority traffic with high-priority traffic over a dedicated link coupling a transmitter to a receiver, said system comprising: at the receiver:
    an HPRx buffer adapted for holding high-priority data being received;
    an LPRx buffer adapted for holding low-priority data being received;
    a Rx controller, having data outputs coupled to the HPRx and LPRx buffers, and data and control inputs;
    a decoder, having data and control outputs 9 coupled to the data and control inputs of the Rx controller, adapted to generate a control character based on data provided at the data output of the decoder when the decoder provides a control signal at the control output; and with the Rx controller, while storing received successive low-priority data words in the LPRx buffer including no low-priority delimiter characters, upon detection of a high-priority initial delimiting control character provided by the decoder adapted to store subsequently received successive high priority data words including no high-priority delimiter characters in the HPRx buffer until the detection of the high-priority terminal delimiting character provided by the decoder, and then to store received successive low-priority data words including no low-priority delimiter characters in the LPRx buffer.

12. The system of claim 11 where the decoder is an 8B/10B decoder.

13. A method for pre-empting low-priority traffic with high-priority traffic over a dedicated link coupling a transmitter to a receiver, the method comprising the steps of:

at the transmitter:

pausing transmission of successive low-priority data words including no low priority delimiter characters when a high-priority message is received;

transmitting a high-priority initial delimiting character marking the beginning of high-priority message data;

transmitting successive high-priority data words without further transmission of high-priority delimiter characters subsequent to the transmission of the high-priority delimiting character;

transmitting a high-priority terminal delimiting character when transmission of the successive high-priority data words stream is completed; and continuing transmission of the of the successive low-priority data words including no low-priority delimiter characters stream subsequent to the transmission of the high-priority terminal delimiting character:

at the receiver:

receiving the successive low-priority data words stream and storing the successive low-priority data words stream as low-priority message data in a first buffer; when the first a high-priority initial special delimiting character is detected, storing successive data words received subsequent to detecting the high-priority initial delimiting character data as high-priority message data in a second buffer until the second a high-priority terminal delimiting character is detected; and storing successive data words received subsequent to detecting the second high-priority terminal delimiting character as low-priority message data in the first buffer.

14. The method of claim 13 where the step of transmitting a high-priority initial delimiting character further comprises the step of:

transmitting a first selected 8B/10B control character;

and where the step of transmitting a high-priority terminal delimiting control character further comprises the step of:

transmitting a second selected 8B/10B control character.

15. A method for pre-empting low-priority traffic with priority high-traffic over a dedicated link coupling a transmitter to a receiver, the method comprising the steps of:

at the transmitter:

pausing transmission of successive low-priority data words including no low priority delimiter characters when a high-priority message is received;

transmitting a high-priority initial delimiting character marking the beginning of high-priority message data;

transmitting successive high-priority data words without further transmission of high-priority delimiter characters subsequent to the transmission of the high-priority delimiting character;

transmitting a high-priority terminal delimiting character when transmission of the successive high-priority data words stream is completed; and continuing transmission of the of the successive low-priority data words including no low-priority delimiter characters subsequent to the transmission of the high-priority terminal delimiting character.

16. The method of claim 15 where the step of transmitting a high-priority initial delimiting character further comprises the step of:

transmitting a first selected 8B/10B control character;

and where the step of transmitting a high-priority terminal delimiting control character further comprises the step of:

transmitting a second selected 8B/10B control character.

17. A method for pre-empting low-priority traffic with high-priority traffic over a dedicated link coupling a transmitter to a receiver, the method comprising the steps of:

at the receiver:

receiving successive low-priority data words stream including no low priority delimiter characters and storing the successive low-priority data words as low-priority message data in a first buffer;

when a high-priority initial special delimiting character is detected, storing successive data words including no high-priority delimiter characters received subsequent to detecting the high-priority initial delimiting character as high-priority message data in a second buffer until a high-priority terminal delimiting character is detected; and storing successive data words including no low-priority delimiter characters received subsequent to detecting the high-priority terminal delimiting character as low-priority message data in the first buffer.

18. The method of claim 17 further comprising the steps of:

detecting whether the high-priority initial delimiting character is a first selected 8B/10B control character; and detecting whether the high-priority terminal delimiting character is a second selected 8B/10B control character.

19. A system for pre-empting low-1 priority traffic with high-priority traffic over a dedicated link coupling a transmitter to a receiver, the system comprising: at the transmitter:

means for pausing transmission of successive low-priority data words including no low-priority delimiter characters when a high-priority message is received;

means for transmitting a high-priority initial delimiting character marking the beginning of high-priority message data;

means for transmitting successive high-priority data words without further transmission of high-priority delimiter characters subsequent to the transmission of the high-priority delimiting character;

means for transmitting a high-priority terminal delimiting character when transmission of the successive high-priority data words stream is completed; and means for continuing transmission of the of the successive low-priority data words including no low-priority delimiter characters stream subsequent to the transmission of the high-priority terminal second special delimiting character: at the receiver:

means for receiving successive low-priority data words stream and storing the successive low-priority data words as low-priority message data in a first buffer;

means for, when a high-priority initial delimiting character is detected, storing successive data words received subsequent to detecting the high-priority initial delimiting character as high-priority message data in a second buffer until a high-priority terminal delimiting character is detected; and means for storing successive data words received subsequent to detecting the high-priority terminal delimiting character as low-priority message data in the first buffer.

20. The system of claim 19 where the means for transmitting a high-priority initial delimiting character further comprises:

means for transmitting a first selected 8B/10B control character;

and where the means for transmitting a high-priority terminal delimiting control character further comprises:

means for transmitting a second selected 8B/10B control character.

21. A system for pre-empting low-priority traffic with high-priority traffic over a dedicated link coupling a transmitter to a receiver, the system comprising:

at the transmitter:

means for pausing transmission of successive low-priority data words including no low-priority delimiter characters when a high-priority message is received;

means for transmitting a high-priority initial delimiting character marking the beginning of high-priority message data;

means for transmitting successive high-priority data words without further transmission of high-priority delimiter characters subsequent to the transmission of the high-priority delimiting character;

means for transmitting a high-priority terminal delimiting character when transmission of the successive high-priority data words stream is completed; and means for continuing transmission of the of the successive low-priority data words including no low-priority delimiter characters subsequent to the transmission of the high-priority terminal delimiting character.

22. The system of claim 21 where the means for transmitting a high-priority initial delimiting character further comprises the step of:

means for transmitting a first selected 8B/10B control character;

and where the means for transmitting a high-priority terminal delimiting control character further comprises:

means for transmitting a second selected 8B/10B control character.

23. A system for pre-empting low-priority traffic with high-priority traffic over a dedicated link coupling a transmitter to a receiver, the system comprising:

at the receiver:

means for receiving successive low-priority data words including no low priority delimiter characters stream and storing the successive low-priority data words stream as low-priority message data in a first buffer;

means for, when a high-priority initial delimiting character is detected, storing successive data words including no high-priority delimiter characters received subsequent to detecting the high-priority initial delimiting character data as high priority message data in a second buffer until a high-priority terminal delimiting character is detected; and means for storing successive data words including no low-priority delimiter characters received subsequent to detecting the high-priority terminal delimiting character as low-priority message data in the first buffer.

24. The system of claim 23 further comprising:

means for detecting whether the high-priority initial delimiting character is a first selected 8B/10B control character; and means for detecting whether the high-priority terminal delimiting character is a second selected 8B/10B control character.

* * * * *